July 4, 1950 — W. STRUMBOS — 2,514,102
CIGARETTE CASE FOR STEERING WHEELS OF AUTOMOBILES
Filed May 11, 1949
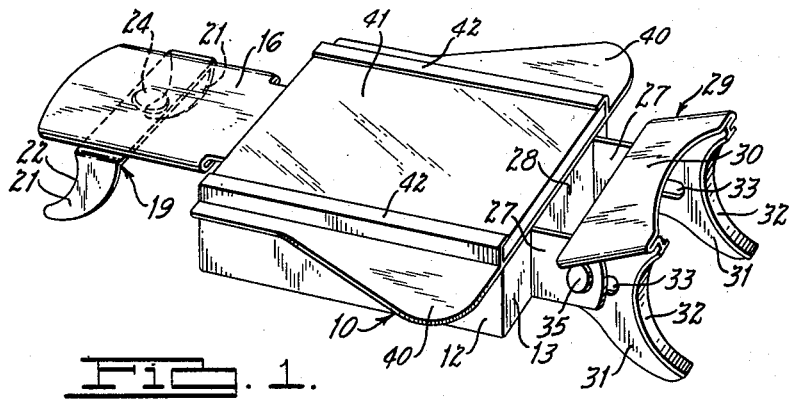
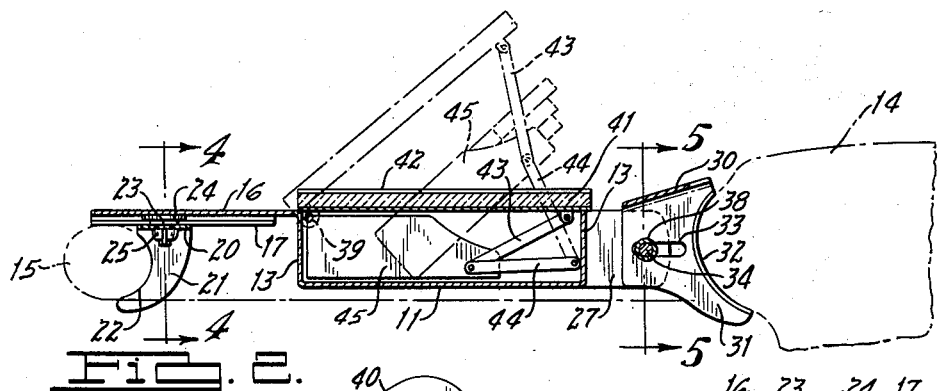
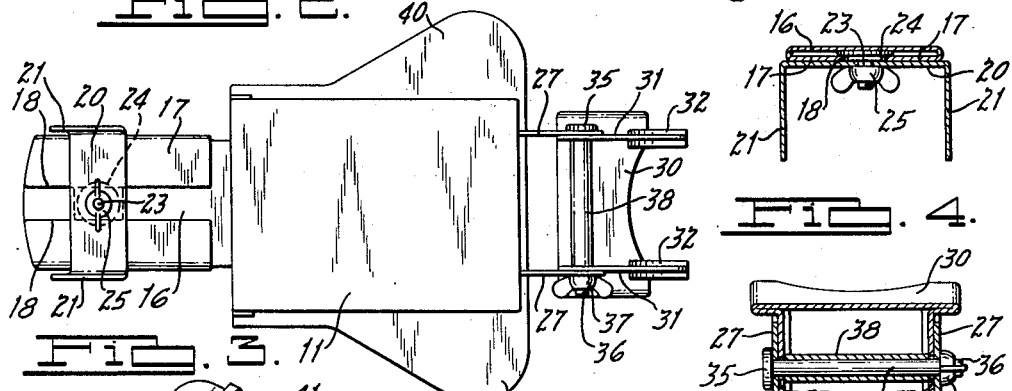
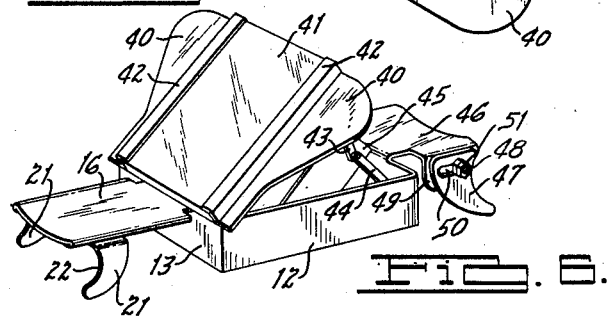
INVENTOR:
William Strumbos,
BY Louis Chengka
ATTORNEY.

Patented July 4, 1950

2,514,102

UNITED STATES PATENT OFFICE 2,514,102

CIGARETTE CASE FOR STEERING WHEELS OF AUTOMOBILES

William Strumbos, Detroit, Mich.

Application May 11, 1949, Serial No. 92,598

5 Claims. (Cl. 206—19.5)

My improvement pertains to cigarette cases which may be mounted upon a steering wheel of an automobile for ready access to cigarettes held therein, as generally described in my application Serial Number 89,121, filed on April 22, 1949.

Specifically, the purpose of my improvement is to provide a case which includes adjustable elements permitting the mounting of the case upon steering wheels which may differ as to their respective diametrical dimensions.

I will now describe my improvement with reference to the accompanying drawings, in which:

Figure 1 is a perspective view of my cigarette case;

Figure 2 is a longitudinal sectional view of my case as mounted upon a steering wheel of an automobile, parts of the steering wheel being shown in dotted lines;

Figure 3 is the bottom elevational view of my cigarette case;

Figure 4 is a sectional view on line 4—4 of Figure 2;

Figure 5 is a sectional view on line 5—5 of Figure 2;

Figure 6 is a modified species of my cigarette case.

Similar numerals refer to similar parts throughout the several views.

The main body of the case may be stamped out of one blank of sheet metal, and includes a rectangular container, generally identified by numeral 10, the container having a flat bottom 11, upright side walls 12, and upright end walls 13. As the case is to be mounted upon a steering wheel midway between the hub portion 14 and the rim 15 thereof, the case includes means for engagement with both said elements, these, at one end of the case, including an integrally formed flat plate 16 extending towards said rim 15. The side portions 17 of the plate are turned under and disposed parallel to said plate 16, but in a spaced relation to each other. Mounted on the underside of the plate is a brace, generally indicated by numeral 19, the brace including a flat bar 20 disposed transversely to the plate 16 and having its outer ends turned down to form claws 21. The edges of the claws are recessed, as shown at 22, to fit, edgewise, the curved body of the rim portion 15 of the steering wheel. A hole, centrally located in bar 20, is designed to receive a short bolt 23 having a broad head 24 which fits between plate 16 and the under-turned side portion 17, the shank of the bolt fitting between edges 18. A wing nut 25, fitting over the shank on the underside of bar 20, keeps said bar in place.

Affixed to the opposite end of the container is a U-shaped bracket, including two arms 27 and a transverse member 28, which, being parallel to wall 13, may be suitably connected thereto by rivets, or in any other suitable manner. Disposed between the arms, in a longitudinal telescopic relation thereto, is a hub abutting member 29. This is made of one piece of sheet metal, and includes a transverse apron 30 to cover the top edges of arm 27 and downwardly turned claws 31, each including an arcuate flange 32 adapted to bear against the hub 14, as shown in Fig. 2. Each claw is provided with a slot 33, the slots in the claws being alined for reception of a bolt 34, one end of which is provided with a broad head 35 on the outer side of one arm 27 of the aforesaid bracket, the other end 36 of the bolt being threaded for application of a wing nut 37. A sleeve 38 seated on the bolt between the claws 31 keeps said claws at the desired spacing.

A cover 38, hinged to the container 10 at 39 to fit over the open top of the container, is provided with lateral wings 40. An ornamental plastic plate 41, on the top surface of the cover, is retained in place by means of rails 42 extending in parallel relation to each other. The cover is connected by means of links 43 and 44 to a bucket 45, including a conventional pack of cigarettes. As the specific construction of the bucket and its operative connection with the other members of my cigarette case is not inventive and has already been described by me in my application Serial Number 89,121, further discussion thereof is not deemed necessary.

The modified species of my case, shown in Fig. 6, includes a container in which one wall 45, at the end adjoining the hub 14 of the steering wheel, has an integrally formed plate 46 at the level of the top of the container, the plate extending outwardly and having side portions 49 turned downwardly, each of said portions 47 being provided with an outwardly projecting screw 48. A claw 47, having a slot 50, is supported by said screw on each portion 47 in a manner permitting a shift of the claw away from or towards the hub 14 for abutment therewith. A tightening nut 51 upon said screw 48 serves to secure each claw in its place.

The manner in which the cigarette case may be mounted upon a steering wheel is quite obvious. Claws 21, under plate 16, are applied against the curved portion of rim 15 of the steering wheel. The claws at the opposite end of the cigarette case are applied against the hub portion 14, as best shown in Fig. 2. As the distance between the hub and the rim 15 may differ, the claws at either end may be shifted longitudinally with respect to the length of the container to put the cigarette case in place, and then shifted back for abutment with the hub or the hub and secured in place by means of the respective wing nuts, that is, either wing nut 25 or 37, as the case may be.

It will be understood that some further changes may be made in the structure of the cigarette case disclosed by me, and that these changes may be made within the scope of the inventive principle described herein.

What I therefore wish to claim is as follows:

1. As a part of a cigarette case adapted to be mounted upon an automobile steering wheel, including a hub and a rim, a rectangular container having a flat bottom and upright side and end walls, an integrally connected flat plate extending from the top of one end wall of the container, a transverse brace slidingly mounted upon said plate for abutment with the hub, an integrally connected plate extending from the top of the opposite end of the container outwardly, and means in a slideable relation to said plate for abutment against the rim of the steering wheel.

2. As a part of a cigarette case adapted to be mounted upon an automobile steering wheel midway between the hub and the rim, a rectangular container having a flat bottom and upright side and end walls, a plate extending from the top of one end wall towards the rim, another plate extending from the top of the opposite end wall towards the hub, an adjustable sliding member on the first-named plate for abutment with the rim, an adjustable sliding member on the second-named plate for abutment with the hub, and means to secure said slideable members against displacement.

3. As a part of a cigarette case adapted to be mounted upon a steering wheel of an automobile, including a hub and rim, a rectangular container having a bottom and upright side and end walls, a plate extending from the top of one end wall outwardly towards the rim portion of the steering wheel, a transverse brace in a sliding relation to the plate, the brace including downwardly extending claws having arcuate recesses therein for abutment against said rim portion, screw means to secure the brace against displacement, and claw means at the other end of the container for abutment against the hub portion of the steering wheel.

4. A cigarette case adapted to be mounted upon an automobile steering wheel, having a hub and rim portion, said cigarette case comprising a rectangular container having a bottom and upright side and end walls, a plate extending from the top of one end wall outwardly towards the rim portion of the steering wheel, a transverse brace in a sliding relation to the plate, the brace including downwardly extending claws having arcuate recesses therein for abutment against said rim portion, screw means to secure the brace against displacement, claw means at the other end of the container for abutment against the hub portion of the steering wheel, a hinged cover for the container, and a cigarette-containing bucket within said container, the bucket being pivotally connected to the underside of the cover and adapted to be partly lifted out of the container on the upward swing of the cover.

5. As a part of a cigarette case adapted to be mounted upon an automobile steering wheel, having a hub and rim portion, a rectangular container having upright side and end walls, a member extending from one end wall towards the rim, a member extending from the opposite end wall towards the hub, and claw means on both members for abutment with the hub and the rim of the steering wheel, respectively, the claw means, at least on one member, being longitudinally adjustable with respect thereto.

WILLIAM STRUMBOS.

No references cited.